United States Patent [19]

O'Shea et al.

[11] 4,041,105

[45] Aug. 9, 1977

[54] POLYURETHANE ELASTOMER DERIVED FROM GRAFT OF ETHYLENICALLY UNSATURATED MONOMER ON POLYALKYLENE ETHER GLYCOL

[75] Inventors: Francis X. O'Shea, Naugatuck; Chung-Ling Mao, Sandy Hook, both of Conn.

[73] Assignee: Uniroyal, Inc., New York, N.Y.

[21] Appl. No.: 661,595

[22] Filed: Feb. 26, 1976

[51] Int. Cl.² ............................................. C08H 75/00
[52] U.S. Cl. ................................ 260/859 R; 260/77.5 CR
[58] Field of Search ............................................. 260/859

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,523,093 | 8/1970 | Stamberger | 260/2.5 |
| 3,641,199 | 2/1972 | Niederahuser | 260/859 R |
| 3,694,415 | 9/1972 | Honda | 260/77.5 CR |
| 3,859,381 | 1/1975 | Hutchinson | 260/859 R |
| 3,860,672 | 1/1975 | Lagally | 260/859 R |
| 3,875,258 | 4/1975 | Patton | 260/869 |
| 3,907,751 | 9/1975 | Knight | 260/47 UA |
| 3,915,937 | 10/1975 | O'Shea | 260/77.5 AM |
| 3,926,875 | 12/1975 | Tsugukuni | 260/859 R |
| 3,954,686 | 5/1976 | Lagally | 260/2.5 AK |
| 3,968,089 | 7/1976 | Cuscurida | 260/859 |

Primary Examiner—Paul Lieberman
Attorney, Agent, or Firm—James J. Long

[57] ABSTRACT

Flexible automobile exterior body parts are molded from a polyurethane elastomer prepared from a reaction mixture comprising:
a. a "graft" polyol prepared by the in situ polymerization of one or more ethylenically unsaturated monomers in a poly(oxypropylene)-poly(oxyethylene) glycol of molecular weight from about 1750 to about 4000 and containing from 15 to 50% oxyethylene groups by weight,
b. methylenebis(4-phenylisocyanate),
c. 1,4-butanediol.

5 Claims, No Drawings

POLYURETHANE ELASTOMER DERIVED FROM GRAFT OF ETHYLENICALLY UNSATURATED MONOMER ON POLYALKYLENE ETHER GLYCOL

Flexible exterior body parts for automobiles, including parts associated with energy-absorbing bumper systems such as sight shields, fender extensions and full fascia front and rear ends, require a material with a particular set of properties. The material must be capable of flexing under impact and then returning to its original shape. Therefore, it must be elastomeric in nature. It must have strength as typified by high tensile strength and high tear strength.

In addition, there are two more stringent requirements. It must be capable of withstanding dynamic impact at −20° F. and it must be resistant to distortion at 250° F. The latter requirement is imposed by typical conditions under which painted pieces are dried.

One class of materials which has been used for this purpose is polyurethane elastomers. Polyurethane elastomers are "block" type polymers resulting from the reaction of a polymeric diol of molecular weight of from about 500 to 5000 with a diisocyanate and a low molecular weight difunctional compound commonly referred to as the "chain extender". The chain extender has a molecular weight below 500 and generally below 300.

The polymeric diol is recognized as the "soft" segment of the elastomer, conferring elasticity and softness to the polymer. Typically, this component has a molecular weight of about 1000 to 2000 and may be a poly(alkylene ether) glycol such as poly(tetramethylene ether) glycol or poly(oxypropylene) glycol, a polyester diol, a polycaprolactone diol or polybutadiene diol.

Another class of polymeric diols recently described for use in polyurethane elastomers are "graft" polyols prepared by the in situ polymerization of ethylenically unsaturated monomers in a polyol. These products are described in U.S. Pat. No. 3,383,351 to Stamberger. Among the suitable polyols described are poly(oxypropylene) glycols and mixed poly(oxyethylene)-poly(oxypropylene) glycols (column 8, lines 28–30).

The combination of the diisocyanate and the chain extender comprises the "hard" segment of the elastomer, contributing rigidity and strength. Typical diisocyanates include 2,4-tolylene diisocyanate and methylene-bis(4-phenylisocyanate). The chain extenders are typically diamines or diols. Typical diols which may be used are listed, for example, in U.S. Pat. Nos. 3,233,025 (col. 4, lines 20–26), 3,620,905 (col. 2, lines 53–59) and 3,718,622 (col. 2, lines 10–18).

While polyurethane elastomers as a class have excellent tear strength and tensile strength and can be designed to the required modulus and elongation, not all polyurethane elastomers can meet the two requirements of low temperature impact resistance and resistance to heat distortion. In fact, a polyurethane elastomer based on poly(oxypropylene) glycol as the polymeric diol and 1,4-butanediol as the chain extender has not yet been used for flexible automobile body parts because of the previous deficiencies of such an elastomer in these two areas. It is generally recognized (N. E. Rustad and R. G. Krawiec, Rubber Age, Nov. 1973, pp. 45-49) that elastomers based on poly(oxypropylene) glycols have poorer low temperature properties than those based on poly(tetramethylene ether) glycol, another polyol used in polyurethane elastomers but higher in cost. One known way to improve the low temperature properties is to increase the molecular weight of the polyol while keeping the mol ratios of ingredients constant. Unfortunately, while the low temperature properties are indeed improved, the hardness and rigidity are normally lowered markedly. See Table II, page 47 of the Rustad et al. article.

In U.S. Pat. No. 3,915,937, O'Shea, Oct. 28, 1975, there is described a poly(oxypropylene) glycol based elastomer suitable for automobile flexible exterior body parts. Such a material can be prepared from a polyol of approximately 1750 to 2500 molecular weight, methylene-bis(4-phenylisocyanate) and 1,4-butanediol, the molar ratio of butanediol to polyol being about 3.0:1 to 9.0:1. That patent is based on the fact that is was most unexpected to be able to make hard elastomers with the necessary high and low temperature properties from poly(oxypropylene) glycol.

While the specific formulation for a poly(oxypropylene) glycol based elastomer necessary to achieve the proper combination of properties had not been described previously, there had appeared a paper describing a similar concept applied to flexible automobile body parts using elastomers based on polycaprolactone diol as the polyol. This paper, by F. E. Critchfield, J. V. Koleske and C. G. Seefried, Jr., was presented at the Automobile Engineering Meeting of the Society of Automobile Engineers in Detroit, Michigan during the week of May 14–18, 1973. Summarizing their data on the polycaprolactone diol based elastomers, the authors stated "for automotive elastomer applications, the thermoplastic polyurethanes based on an approximately 2000 $M_n$ diol are more desirable since they show less modulus-temperature dependence in the use region." They also concluded: "Apparently at similar hard segment concentrations, the molecular weight of the urethane polymer soft segment has a greater effect on the temperature dependence of physical properties than the molecular length of the hard segment sequences." They attributed the unique properties of these materials to be the result of incompatibility on a microscopic scale between the hard and soft segments. In turn, "Incompatibility quite probably is due to the molecular weight of the soft segment being high enough to be immiscible in a thermodynamic sense with the hard segment."

Completely independent of the paper last mentioned above, it was found, in accordance with the above-cited O'Shea patent, that polyurethane elastomers suitable for the preparation of flexible automobile exterior body parts may be obtained from the reaction of a mixture comprising:

a. a polymeric diol selected from the group consisting of poly(oxypropylene) glycol and ethylene oxide "tipped" poly(oxypropylene) glycol containing up to 10% by weight ethylene oxide and of molecular weight from about 1750 to about 2500 (preferably about 2000);

b. methylenebis (4-phenylisocyanate);

c. 1,4-butanediol.

In the O'Shea patent the effect of the polyol molecular weight on the required properties was demonstrated. It was shown that polymer based on 1000 molecular weight polyol failed the low temperature impact and heat distortion tests while the polymer based on 2000 molecular weight polyol passed both tests. The acceptable range of polyol molecular weight was shown to be 1750 to 2500. An elastomer prepared from a 1500 molecular weight polyol was not acceptable with respect to low temperature impact while a polymer based on 3000 molecular weight polyol had lowered physical properties. The latter results was believed to be due to separation of soft and hard phases early enough in the polymerization to immobilize reactive end groups and thereby inhibit chain extension.

Although the polymers described in the O'Shea patent are useful and can be handled with reasonable care, they do suffer from one deficiency, that of poor thermal stability at processing temperatures. In normal use this deficiency may not present a serious problem and may even go unnoticed. However, since occasions may and often do arise in which material may be left in the barrel of an extruder or in an injection molding machine for extended periods at elevated temperatures, it would be advantageous for a material to have superior thermal stability. In this way it would be possible to leave the material in the machines at temperature during short shutdowns and then resume operations with no clean-out and waste necessary. In addition, it would insure that inferior parts would not be produced because of thermally induced decomposition of the elastomer during the proces. This is especially of concern when it is desired to use "regrind".

In a copending application, Ser. No. 612,420 of O'-Shea, filed Sept. 11, 1975, it was demonstrated that elastomers based on poly(oxypropylene)-poly(oxyethylene) glycols of oxyethylene group content 15% or more possess significantly better thermal stability than those based on polyols containing 10% or less oxyethylene group content. Particularly preferred were polyols containing 30% or more oxyethylene group content. It was found that this improvement in thermal stability could be achieved with no sacrifice in the properties essential to automobile flexible body part use. In fact, slightly better strength properties appeared to result from the use of polyols with higher ethylene oxide content.

We have now found, in accordance with the present invention, that this improvement extends to polymers based on "graft" polyols prepared by the in situ polymerization of one or more ethylenically unsaturated monomers in a poly(oxypropylene)-poly(oxyethylene) glycol. Preferred glycols are those of molecular weight 1750 to about 4000 and containing 15 to 50% oxyethylene groups by weight. Particularly preferred are poly(oxypropylene)-poly(oxyethylene) glycols containins 30 to 50% oxyethylene group content.

Such "graft" polyols provide additional surprising advantages in that the resultant elastomers possess an improved measure of mold release characteristics and the modulus of the molded parts is enhanced. These unexpected improvements can be important in allowing the molding of parts more economically through the use of shorter cycles.

Our invention, therefore, may be described in the following manner:

Polyurethane elastomers suitable for the preparation of flexible automobile exterior body parts may be obtained from the reaction of a mixture comprising:

a. a "graft" polyol prepared by the in situ polymerization of one or more ethylenically unsaturated monomers in a poly(oxypropylene)-poly(oxythylene) glycol of molecular weight from about 1750 to about 4000 and containing from 15 to 50% oxyethylene groups by weight, b. methylenebis(4-phenylisocyanate), c. 1,4-butanediol.

In order to study thermal stability the following test was devised. Polymer samples were molded into 3 × 4 × 0.07 inch plaques in a single cavity mold using a ½ oz. Newbury injection molding machine at barrel and nozzle temperatures of 415° F. (213° C). After several pieces were molded, material was allowed to stand in the barrel of the machine for twenty minutes at temperature. Then another molding was made. Tensile strength was measured on samples molded with and without this thermal treatment using standard ASTM procedures. In this test typical elastomers of the invention retain at least twice as much of their original tensile strength as otherwise similar elastomers made from poly(oxypropylene)-poly(oxyethylene) glycol containing 10% or less of oxyethylene group content.

The elastomers of the invention meet the requirements for flexible exterior body parts for automobiles. They have a hardness of about 40 to 55 Shore D, preferably 45 to 50 Shore D. They have an elongation greater than 300%, an ultimate tensile strength of about 2500 psi or greater and a Die C tear strength of 500 pli or greater.

Painted parts made from these elastomers remain intact under a 5 MPH impact at −20° F. To simulate the dynamic conditions involved in a 5 MPH impact at −20° F., a drop impact test system was developed. The unit consists basically of a vertical guide tube, a drop weight of appropriate design and associated instrumentation.

Polymers to be evaluated were molded into 2 × 6 × 0.08 inch specimens which were conditioned in an environmental chamber to −20° F.and then fitted into two slots 3 inches apart so that the sample formed an inverted "U" with a total flexed height of 2 inches. The sample was impacted at its center line with a force of 50 ft. lbs., the weight traveling at greater than 5 MPH at impact. Drop height above the top of the sample was 38 inches. The drop weight is an 18 inch long cylinder weighing 16 lbs. It is 2.5 inches in diameter for 16.5 inches of its length and then tapers to a blunt end, which is the striking surface.

Polymers with inadequate low temperature impact resistance invariably fractured in this test. This test correlates well with the automobile manufacturer's testing where full size parts are made and mounted on a car or a portion of a car. After cooling to −20° F., the full size part is hit with a pendulum weight which is traveling at 5 MPH.

Parts made from the present elastomers also withstand paint oven temperatures of 250° F. without objectionable shrinkage or distortion. To evaluate materials for heat distortion characteristics, a sag resistance test (Heat Test O's) was developed. The apparatus consists of a jig to hold a 2 × 6 × 0.88 inch injection molded sample in a horizontal plane. The sample is mounted with 4 inches suspended beyond the edge of the clamp. The jig with the sample is then placed in an oven preheated at 250° F. for ½ hour. The amount of sag is the difference in height from the end of the sample to a horizontal plane before and after exposure to heat. Experience with a material that was acceptable to automobile manufacturers has shown that polyurethane elastomers with a sag less than 2.0 inches by this test will perform satisfactorily in paint bake ovens used to cure painted large automotive parts. The present elastomers meet this test.

Example 1 describes the preparation of a "graft" polyol of styrene and acrylonitrile on an 1800 molecular weight poly(oxypropylene)-poly(oxyethylene) glycol containing 30% by weight oxyethylene groups and lists the other "graft" polyols prepared by this procedure.

Example 2 describes the conversion of these "graft" polyols to polyurethane elastomers by reaction with 4,4'-methylenebis(phenylisocyanate) and 1,4-butanediol.

Example 3 compares the thermal stability of three polymers made from "grafted" 2000 molecular weight polyols and demonstrates the superior thermal stability of the polymer based on the polyol containing the higher level of oxyethylene groups.

Example 4 compares the thermal stability of three polymers made from "grafted" 3000 molecular weight polyols. The results demonstrate not only the superior thermal stability of the polymers based on polyols containing higher levels of oxyethylene groups but also the superior initial tensile strength of those polymers.

Example 5 compares the thermal stability of three polymers made from "grafted" 4000 molecular weight polyols. The results again demonstrate the superior thermal stability of the polymers based on polyols containing higher levels of oxyethylene groups and the superior initial tensile strength of those polymers.

Example 6 shows the excellent thermal stability of a polymer derived from a "graft" of styrene and acrylonitrile onto an 1800 molecular weight poly(oxypropylene)-poly(oxyethylene) glycol containing 30% oxyethylene groups.

Example 7 demonstrates the ability of elastomers based on grafts of styrene and acrylonitrile on both an 1800 molecular weight polyol containing 30% oxyethylene groups and a 4000 molecular weight polyol containing 45% oxyethylene group to pass both low temperature and heat sag requirements for automotive parts.

The examples demonstrate that useful products may be made from grafts onto polyols of 1800 to 4000 molecular weight. They show that oxyethylene group content of 15% or more is necessary since 10% oxyethylene group content in a 2000 molecular weight polyol gives an elastomer with borderline thermal stability. The data also show that higher oxyethylene group content is required as the molecular weight of the polyol increases. Thus, 30% to 45% by weight oxyethylene group content is preferred, especially when molecular weight of the polyol exceeds 3000.

The molar ratio of chain extender to polyol which may be used depends on the molecular weight of the polyol. It ranges from 4/1 for a grafted 1750 molecular weight polyol to 12/1 for a grafted 4000 molecular weight polyol. The NCO/OH ratio used to prepare the elastomers may range from 0.95 to 1.2 with 1.00 to 1.05 being preferred.

The ethylenically unsaturated monomeric materials useful for grafting onto the polyol are well known in the art and include the hydrocarbon monomers such as butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methyl 4-vinyl-benzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, methyl methacrylate, cyclohexyl methacrylate, benzyl methacrylate, isopropyl methacrylate, octyl methacrylate, methacrylonitrile, methyl alpha chloroacrylate, ethyl alpha-ethoxyacrylate, methyl alpha acetaminoacrylate, butyl acrylate, 2-ethylhexyl -acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, methyl vinyl sulfonate, N-vinyl pyrrole, and the like; dimethyl fumarate, dimethyl maleate, maleic acid, crotonic acid, fumaric acid, itaconic acid, monomethyl itaconate, 1-butylaminoethyl methacrylate, dimethylaminoethyl methacrylate, glycidyl acrylate, dichlorobutadiene, vinyl pyridine, and the like. Preferred materials are the vinyl aryl monomers (especially styrene and alpha-methyl styrene), the acrylic nitriles (especially acrylonitrile and methacrylonitrile), and the alkyl alkenoate esters (especially methyl and ethyl acrylate and methacrylate). Reaction conditions and free radical catalysts which may be used in the grafting reaction are described in the above-cited Stamberger patent on column 4, lines 15-50. The amounts of polymerized monomer in the graft polyol may range from 5 to 50% by weight as described in the above patent on column 10, lines 2-3. The preferable concentration is about 20%.

The elastomers of this invention may be prepared by a prepolymer process in which the polyol is first reacted with the diisocyanate and subsequently reacted with the chain extender in a separate step or by a "one-shot" technique in which the polyol, chain extender and diisocyanate are reacted together in one step. The preparation of an elastomer of this invention by a "one-shot" reaction is described in Example 8.

A catalyst may or may not be used as desired. Some examples of useful catalysts are N-methyl-morpholine, N-ethyl-morpholine, triethylamine, triethylene diamine (Dabco), N,N'-bis(2-hydroxypropyl)-2-methyl piperazine, dimethyl ethanol amine, tertiary amino alcohols, tertiary ester amines, stannous octoate, dibutyl tin dilaurate and the like.

EXAMPLE 1

To a 3-neck one liter round bottom flask equipped with nitrogen sparge, addition funnel, mechanical stirrer and reflux condenser was added 320 grams of a 1800 molecular weight poly(oxypropylene)-poly(oxyethylene) glycol containing 30% by weight oxyethylene groups. The polyol was heated to 115° C. while under nitrogen. To this polyol a mixture containing 160 grams of polyol, 60 gms. of acrylonitrile, 60 gms. of styrene and 3.0 gms. of azobis-isobutyronitrile was added at a uniform rate over a 2 hour period. The temperature was maintained at 115° C. for 30 minutes after monomer addition was completed. Unpolymerized monomer was removed from the white dispersion under a pressure less than 10 mm. Hg at approximately 100° C. with good agitation. The polymer polyol was stripped for four hours and analysis of the resultant polyol (Polyol "A") gave a hydroxyl number of 51.

In the same way the following grafted polyols were prepared. All were grafted with 10% by weight each of styrene and acrylonitrile.

| Polyol | Wt. % Oxyethylene Groups | Initial Mol. Wt. |
|--------|--------------------------|------------------|
| B | 45 | 2000 |
| C | 10 | 2000 |
| D | 0 | 2000 |
| E | 45 | 3000 |
| F | 30 | 3000 |
| G | 12.4 | 3000 |
| H | 45 | 4000 |
| I | 30 | 4000 |
| J | 10 | 4000 |

Additional grafted polyols were prepared from a 2000 molecular weight poly(oxypropylene)-poly(oxyethylene) glycol containing 45% by weight oxyethylene groups using 10% each by weight of a pair of monomers. The monomer pairs were:

| Polyol | Monomer Pair |
|--------|--------------|
| K | acrylonitrile - ethyl acrylate |
| L | styrene - ethyl acrylate |
| M | acrylonitrile - methyl methacrylate |
| N | styrene - methyl methacrylate |

EXAMPLE 2

Two-hundred fifty parts of polymer polyol "A" was reacted with 157 parts of 4,4'-methylenebis (phenylisocyanate) at 80° C. for 1 hour to form an isocyanate-terminated prepolymer. To 390 parts of the prepolymer at 110° C. was added 43.7 parts of 1,4-butanediol (preheated to 50° C.) with vigorous stirring. The mixture was then poured onto a 12 × 12 × 0.25 inch open mold and cured at 325° F. for 20 minutes. The cured polymer (Elastomer A) was diced, dried at 110° C. for 2 hours and then injection molded into 3 × 4 × 0.07 inch plaques. Physical properties were obtained by standard ASTM methods.

In the same way the following polyurethane elastomers were prepared.

| Elastomer | Polyol | Parts-Polyol | Parts-MDI | Parts-Prepolymer | Parts-1,4-Butanediol |
|-----------|--------|--------------|-----------|------------------|----------------------|
| B | B | 595 | 350 | 900 | 95 |
| C | C | 595 | 350 | 900 | 95 |
| D | D | 300 | 185 | 470 | 52.2 |
| E | E | 300 | 189 | 460 | 56.4 |
| F | F | 300 | 180 | 460 | 54.5 |
| G | G | 300 | 181 | 470 | 55.8 |
| H | H | 300 | 185 | 460 | 57.6 |
| I | I | 300 | 185 | 460 | 57.2 |
| J | J | 300 | 188 | 460 | 57.6 |

EXAMPLE 3

Thermal stability of three polyurethane elastomers were compared by molding the polymers into 3 × 4 × 0.07 inch plaques in a single cavity mold using a ½ oz. Newbury injection molding machine at barrel and nozzle temperatures of 415° F. (213° C.). After several pieces were molded, material was allowed to stand in the barrel of the machine for twenty minutes at temperature. Then another molding was made. Tensile strength was measured on samples molded with and without this thermal treatment using standard ASTM procedures.

| Elastomer | Wt. % Oxyethylene Groups in Polyol | Tensile Strength Initial | After 20 min. at 415° F. |
|-----------|------------------------------------|--------------------------|--------------------------|
| D | 0 | 3520 | 1590 |
| C | 10 | 3950 | 1980 |
| B | 45 | 4510 | 3980 |

The data show the superior thermal stability of the grafted polyol containing the higher level of oxyethylene groups.

EXAMPLE 4

In the same manner as described in Example 3, three elastomers based on grafted 3000 molecular weight polyols were compared for thermal stability.

| Elastomer | Wt. % Oxyethylene Groups in Polyol | Tensile Strength Initial | After 20 min. at 415° F |
|-----------|------------------------------------|--------------------------|-------------------------|
| G | 12.4 | 2650 | 1280 |
| F | 30 | 3430 | 1930 |
| E | 45 | 4080 | 3550 |

The data show the superior thermal stability of the grafted polyol containing the higher level of oxyethylene groups.

EXAMPLE 5

In the same manner as described in Example 3, three elastomers based on grafted 4000 molecular weight polyols were compared for thermal stability.

| Elastomer | Wt. % Oxyethylene Groups in Polyol | Tensile Strength Initial | After 20 min. at 415° F |
|-----------|------------------------------------|--------------------------|-------------------------|
| J | 10 | 1700 | couldn't mold |
| I | 30 | 3800 | 2310 |
| H | 45 | 3860 | 2660 |

The data show the superior thermal stability of the grafted polyols containing the higher level of oxyethylene groups.

EXAMPLE 6

In the same manner as described in Example 3, an elastomer based on a grafted 1800 molecular weight polyol containing 30% by weight oxyethylene groups was tested for thermal stability.

| Elastomer | Tensile Strength Initial | After 20 min. at 415° F. |
|-----------|--------------------------|--------------------------|
| A | 3870 | 3550 |

EXAMPLE 7

Elastomers A and H were injection molded into 2 × 6 × 0.080 inch plaques and tested for low temperature impact strength and heat sag as previously described. Both samples passed the low temperature impact test and sagged less than 2 inches in Heat Test O'S.

Elastomers prepared according to the procedure of Example 2 from Polyols K, L, M and N of Example 1 had tensile strengths of 2640, 3050, 3510 and 2900 psi, respectively.

EXAMPLE 8

Two hundred parts of polymer polyol "E" was mixed with 40.2 parts of 1,4-butanediol to form a masterbatch. A portion of this masterbatch (200 parts) was heated to 120° C and mixed for 20 seconds with 106 parts of 4,4'-methylenebis-(phenylisocyanate) previously heated to 50° C. The mixture was poured into a 12 × 12 × 0.25 inch open mold and cured at 325° F. for 20 minutes. The cured polymer was diced, dried at 110° C for 2 hours and then injection molded into 2 × 2 × 0.125 inch plaques. The tensile strength of bars cut from these plaques was 2500 psi.

The automobile flexible body parts, which are a desired end-product of this invention, are fabricated by injection molding using the already prepared polyurethane elastomer as the molding material. In this method, the elastomer is made into small dice or pellets suitable for feeding to injection molding machines. Using the same preformed material, a part may also be prepared by extrusion techniques including profile extrusion and sheet extrusion followed by vacuum forming.

Alternatively, the part may be formed by the method termed "liquid reaction molding", in which the reactants are rapidly injected into a mold wherein they cure to form the shaped elastomeric article directly. In this method, the polyol, chain extender and diisocyanate may be reacted in one step (one shot method) or the polyol and diisocyanate may be prereacted and then injected along with the chain extender to form the molded article (pre-polymer method).

We claim:

1. A thermally stable polyurethane elastomer which is a reaction product of: (a) a graft polyol prepared by the in situ polymerization of ethylenically unsaturated monomeric material in a poly(oxypropylene)-poly(oxyethylene)glycol of molecular weight from about 1750 to 4000 and containing from 30% to 50% oxyethylene groups by weight, the amount of polymerized monomer in the graft polyol being from 5 to 50 % by weight; (b) methylenebis(4-phenylisocyanate); and (c) 1,4-butanediol; the NCO/OH equivalents ratio being from 0.95 to 1.2 and the molar ratio of (c) and (a) being from 4/1 to 12/1; said elastomer having a hardness of about 40 to 55 Shore D, an elongation of greater than 30%, an ultimate tensile strength of at least 2500 psi and a Die C tear strength of at least 500 pli, said elastomer displaying improved thermal stability as evidenced by its ability to retain at least twice as much of its original tensile strength, after exposure to a temperature of 415° F. for twenty minutes, as an otherwise similar elastomer in which (a) contains 10% or less of oxyethylene groups.

2. A thermally stable polyurethane elastomer as in claim 1 in which the ethylenically unsaturated monomeric material in (a) is selected from the group consisting of styrene, acrylonitrile, ethyl acrylate, and methyl methacrylate, present in amount of 20% by weight.

3. A thermally stable polyurethane elastomer as in claim 2 in which the ethylenically unsaturated material is a mixture of styrene and acrylonitrile, each present in amount of 10% by weight.

4. A thermally stable polyurethane elastomer as in claim 1 in which the molecular weight of (a) is about 2000 and the oxyethylene group content is 30-45% by weight.

5. A shaped article prepared from the thermally stable polyurethane elastomer of claim 1 and characterized, when having a thickness of 0.08 inch, by remaining intact under a 5 mile per hour impact at −20° F. and by having a sag of less than two inches as determined by Heat Test O'S.

* * * * *

UNITED STATES PATENT AND TRADEMARK OFFICE
CERTIFICATE OF CORRECTION

PATENT NO. : 4,041,105
DATED : August 9, 1977
INVENTOR(S) : Francis X. O'Shea et al.

It is certified that error appears in the above–identified patent and that said Letters Patent are hereby corrected as shown below:

Column 10, line 16, for "30%" read -- 300% --

Signed and Sealed this

Fifteenth Day of August 1978

[SEAL]

Attest:

RUTH C. MASON
*Attesting Officer*

DONALD W. BANNER
*Commissioner of Patents and Trademarks*